United States Patent
Fegley et al.

(10) Patent No.: US 8,544,574 B2
(45) Date of Patent: Oct. 1, 2013

(54) GRAIN CART CAPABLE OF SELF-PROPULSION

(75) Inventors: Michael D. Fegley, Bettendorf, IA (US); Alan D. Sheidler, Moline, IL (US); Noel W. Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 81 days.

(21) Appl. No.: 13/186,791

(22) Filed: Jul. 20, 2011

(65) Prior Publication Data

US 2013/0020138 A1 Jan. 24, 2013

(51) Int. Cl.
*B62D 12/00* (2006.01)

(52) U.S. Cl.
USPC ........ 180/14.1; 180/14.4; 180/14.7; 280/472; 701/50

(58) Field of Classification Search
USPC .............. 180/14.1, 14.4, 14.7; 280/472, 473; 701/50
See application file for complete search history.

(56) References Cited

U.S. PATENT DOCUMENTS

| | | | | |
|---|---|---|---|---|
| 1,695,522 | A * | 12/1928 | Benjamin et al. | 56/15.3 |
| 1,832,051 | A * | 11/1931 | Raney et al. | 56/15.3 |
| 2,363,897 | A * | 11/1944 | Paradise et al. | 56/15.5 |
| 2,427,824 | A * | 9/1947 | Vutz | 180/14.1 |
| 2,429,492 | A * | 10/1947 | Scranton | 180/14.1 |
| 2,494,388 | A * | 1/1950 | Heth | 56/153 |
| 2,769,384 | A * | 11/1956 | Selzer | 172/292 |
| 3,336,052 | A * | 8/1967 | Johnston et al. | 280/472 |
| 3,523,410 | A * | 8/1970 | Taylor et al. | 56/10.2 R |
| 4,050,598 | A * | 9/1977 | Schurz | 414/501 |
| 4,076,137 | A * | 2/1978 | Kucera | 414/460 |
| 4,227,844 | A * | 10/1980 | Love | 414/24.5 |
| 5,579,228 | A * | 11/1996 | Kimbrough et al. | 701/41 |
| 5,730,572 | A * | 3/1998 | Scheuren | 414/24.5 |
| 5,904,365 | A * | 5/1999 | Dillon | 280/419 |
| 6,019,562 | A * | 2/2000 | Cheatham | 414/111 |
| 6,739,612 | B2 * | 5/2004 | Colistro | 280/475 |
| 7,142,150 | B2 | 11/2006 | Thackray | |
| 7,266,477 | B2 | 9/2007 | Foessel | |
| 7,743,859 | B2 | 6/2010 | Forsyth | |
| 7,913,782 | B1 * | 3/2011 | Foss et al. | 180/14.4 |
| 2002/0095251 | A1 * | 7/2002 | Oh et al. | 701/70 |
| 2008/0245042 | A1 * | 10/2008 | Brunnert et al. | 56/10.2 F |
| 2010/0063664 | A1 | 3/2010 | Anderson | |
| 2010/0063672 | A1 | 3/2010 | Anderson | |
| 2010/0063673 | A1 | 3/2010 | Anderson | |
| 2010/0094481 | A1 | 4/2010 | Anderson | |
| 2010/0094499 | A1 | 4/2010 | Anderson | |
| 2010/0108188 | A1 * | 5/2010 | Correns et al. | 141/83 |
| 2011/0066337 | A1 * | 3/2011 | Kormann | 701/50 |

OTHER PUBLICATIONS

Andri Ridd, Alara Leibak and Ennu Rustern; Fuzzy Backing Control of Truck and Two Trailers. (6 pages).
Andri Riid, Jaakko Ketola and Ennu Rustern; Fuzzy Knowledge-Based Control for Backing Multi-Trailer Systems; Proceedings of the 2007 IEEE Intelligent Vehicles Symposium, Istanbul, Turkey, Jun. 13-15, 2007; pp. 498-504.

* cited by examiner

*Primary Examiner* — Kevin Hurley
*Assistant Examiner* — Michael Stabley

(57) ABSTRACT

A grain cart capable of self-propulsion and receiving steering and propulsion inputs from a lateral extendable connector to a tractor for the grain cart so that the grain cart may be deployed close to the central chassis of a combine for unloading of grain.

20 Claims, 2 Drawing Sheets

GRAIN CART CAPABLE OF SELF-PROPULSION

FIELD OF THE INVENTION

The present invention relates to agricultural harvesting machines and, more particularly, to devices for collecting crop materials as harvested.

BACKGROUND OF THE INVENTION

Mechanical agricultural harvesting equipment has existed for centuries but there is a continuing need to increase the efficiency of harvesting. This means that a particular machine should be able to harvest over a greater span of crop rows, whether it be crops like corn or soybeans and the like. Combines have been developed to the point where they are multipurpose and can be used for a variety of crop materials. The crop harvesting mechanism can extend laterally for significant distances. While this provides efficiency in the harvesting process, the material thus harvested and processed must be unloaded to mobile grain carts and then to other machines for delivery to the ultimate destination. The grain carts typically have a capacity up to 2-3 times the capacity for the grain tank in the combine. As a result, they have substantial weight and require a tractor or other vehicle transporting them to be substantially in line with the cart itself and have sufficient power. As a result, the lateral extension of the harvesting mechanism on the combine requires that a significantly elongated lateral unloading device be provided with the combine with its attendant problems of reliability and control. The reason for this is that the tractor is in front of the grain cart and the grain cart cannot be deployable significantly behind the combine mechanism.

What is needed in the art, therefore, is an efficient mechanism for unloading combines of substantial capacity that eliminates the need for extended and elongated lateral combine unloading devices.

SUMMARY

In one form, the invention is a self-propelled grain cart for use with an agricultural combine having a central chassis and laterally elongated harvesting mechanism. The grain cart includes a grain receptacle. A plurality of wheels are connected to the grain receptacle, with at least one of the wheels being steerable and at least one of the wheels being powered for ground movement of the grain cart in a given direction. An elongated connector is operatively connected at one end thereof to the at least one steerable wheel and at least one powered wheel, with the connector being deployable laterally relative to the given direction of ground movement for the grain cart. A device is connected to the opposite end of the elongated connector for supplying ground movement and steering inputs to the at least one wheel so that the grain cart can be deployed close to the central axis of the combine.

In another form, the invention is a system for unloading agricultural crop material from a combine having a central chassis and laterally elongated harvesting mechanism and includes a self-propelled agricultural vehicle with a prime mover and a grain cart having a grain receptacle. A plurality of wheels are connected to the grain receptacle with at least one of the wheels being steerable and at least one of the wheels being powered for ground movement of the grain cart in a given direction. An elongated connector is operatively connected at one end thereof to the at least one steerable wheel and at least one powered wheel with the connector being deployed laterally relative to the given direction of ground movement for the grain cart. A device is mounted on said self-propelled agricultural vehicle at the opposite end of the elongated connector for supplying ground movement and steering input to the at least one wheel so that the grain cart can be deployed close to the central chassis of the combine.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one embodiment of the invention and such exemplifications are not to be construed as limiting the scope of the invention in any manner.

DETAILED DESCRIPTION

Figure 1:
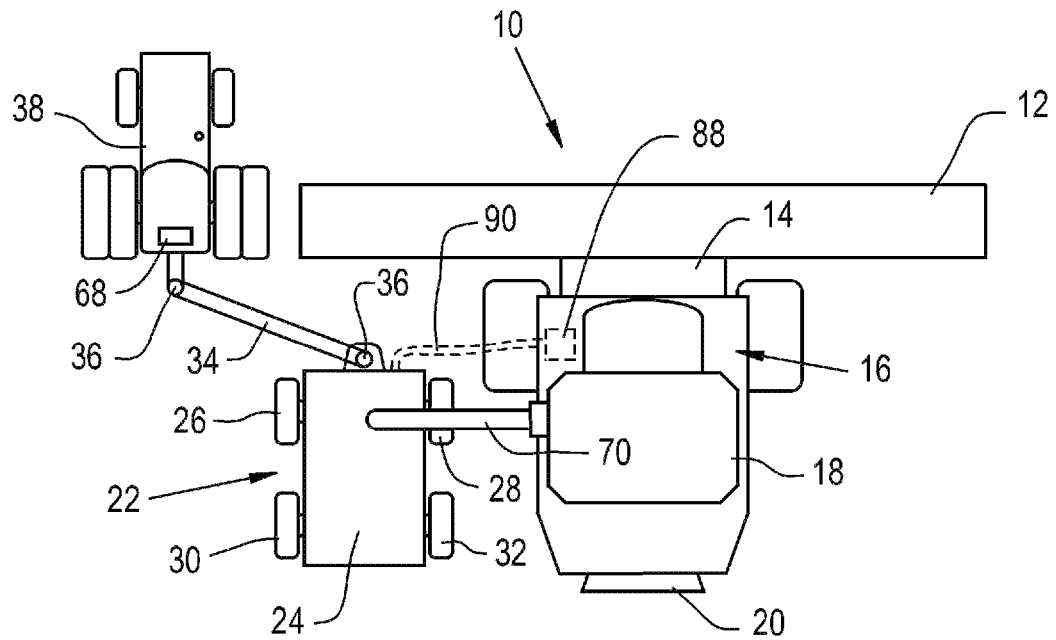
FIG. 1 is a plan view of an agricultural crop unloading system including a grain cart embodying the present invention.

Referring now to the drawings, and more particularly to FIG. 1, there is shown a plan view of an agricultural harvesting system in accordance with the present invention. The agricultural harvesting system includes a combine 10 having a laterally extending harvester mechanism 12 with a central feeder housing 14 to a central chassis 16 containing the prime mover and auxiliary equipment necessary to move and process whatever agricultural crop is harvested. The harvested crop material is delivered to a grain tank 18 and the waste is discharged via outlet 20 to the ground. As indicated above, the lateral harvesting mechanism 12 can reach significant lengths. This necessitates that when the grain tank 18 on the combine is full, it must be unloaded to a transportable cart for delivery to the next stage of distribution for the agricultural crop material. Grain carts can achieve significant weight and capacity requirements such that it is required to tow the grain cart directly behind a tractor or other powered vehicle. With the laterally extending harvesting mechanism 12, it is not possible, in the current state of the art, to provide a proper towing relationship between the tractor and the grain cart. As a result, the unloading mechanism extending from the grain tank 18 must be of significant length.

In accordance with the present invention, a grain cart 22 is provided that is capable of self-propulsion and steering control. The grain cart 22 includes a grain receptacle 24 mounted on an appropriate chassis and containing a plurality of wheels 26, 28, 30, and 32 respectively. As discussed in detail below, these wheels can serve multiple functions beyond mounting the grain cart 22 for ground movement. As illustrated in FIG. 1, a tongue assembly 34 extends from an articulated joint 36 on the front of the grain cart and to an equivalent articulated joint 36 connected to a tractor 38. As described in detail below, the grain cart 22 is adapted to be self-propelled and controlled for movement remotely by operator inputs from a laterally positioned tractor 38. Furthermore, at least one of the wheels is adapted to provide a propulsive input to the cart for movement and at least one is configured to supply a steering input. A connector, which may be the tongue 34, extends to the tractor 38 so that operator inputs for steering and traction may be controlled from the tractor, which is positioned outboard of the end most portion of the harvesting mechanism 12. As described below, the inputs for propulsion and/or steering may be electrical or they may be hydraulic.

Figure 2:
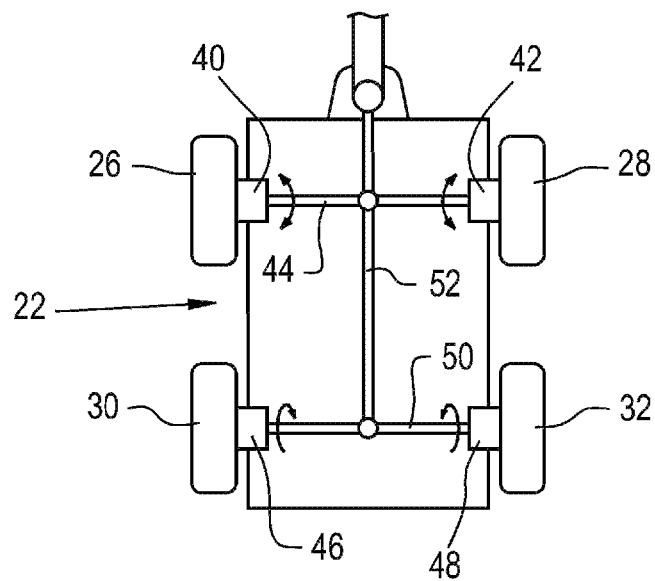
FIG. 2 shows one form of steering and propulsion for the grain cart of FIG. 2 in schematic fashion.

FIG. 2 shows a first grain cart 22 having the ground wheels 26, 28, 30, and 32. In FIG. 2, a steering mechanism 40 and 42 are respectively connected to wheels 26 and 28. The steering mechanism 40 and 42 may receive electrical or hydraulic control inputs via lines 44 to provide appropriate steering of grain cart 22. As illustrated in FIG. 2, grain cart 22 is front steered and has propulsion motors 46 and 48 respectively connected to rear wheels 30 and 32. The propulsion motors 46 and 48 provide forward input at an appropriate level commanded by the operator in tractor 38 via connections 50 and 52 respectively. The control inputs to the various wheel assemblies in FIG. 2 are appropriately provided through the connector, which includes lines 44, 50, and 52. As discussed in detail below, the control inputs may be provided from the tractor 38, which is positioned laterally of the grain cart 22. The advantage of the arrangement shown in FIG. 2 is that the rear traction input provides better propulsive power going up a hill.

Figure 3:
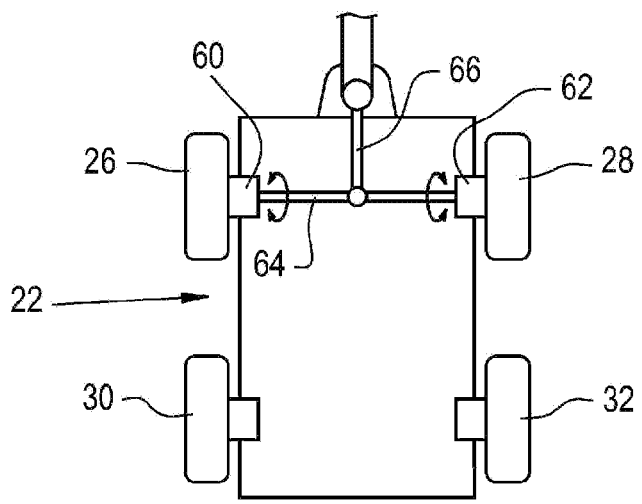
FIG. 3 shows another form of steering and propulsion for the grain cart of FIG. 1.

FIG. 3 shows an alternative arrangement in which the grain cart 22 has the same ground wheels 26, 28, 30, and 32 but that front wheels 26 and 28 include motors 60 and 62 respectively connected to and driving wheels 26 and 28. The arrangement shown in FIG. 3 provides front drive traction for grain cart 22 but a differential speed control allows a directional or steering input. Again, the motors 60 and 62 are connected to the tractor 38 via connector unit 64 and central connector 66 through to tractor 38. As in the case with FIG. 2, the motors 46 and 48 may be electrical in nature, receiving a current input from an appropriate device mounted on tractor 38. If the motors 60 and 62 are electrical, the control input would thus be an electrical current input varying both the power and rpm at the wheels and providing a differential steering in the absence of a uniform rpm for each wheel. It is also possible for the motors 60 and 62 to be hydraulic so that they provide propulsive input to wheels 26 and 28 via the appropriate connector 64 and 66. The motors 60 and 62 may be hydraulic in which motor 60 and 62 respond to pressurized fluid to provide appropriate power and speed for the grain cart. This offers the advantage of simplicity in that the differential rpm of the front wheels is used for steering, thus, obviating the need for a separate steering assembly.

Referring back to FIG. 1, the source of steering and propulsion inputs to the grain cart 22 is provided from a device 68 mounted in tractor 38. Device 68 may be an electrical generator with appropriate current input to the respective wheels to provide the steering and/or ground propulsion inputs or it may be a hydraulic pump connected to appropriate hydraulic motors through conduits so as to provide the equivalent ground speed and turning responses. In either case, the prime power for the unit 68 is provided by a PTO from the tractor 38 or other device. Furthermore, the tractor 38 contains an operator control input so that the operator of the tractor 38 can control, from his station significantly outboard of the lateral extent of harvesting mechanism 12, the speed and steering capability of grain cart 22 to cause it to closely follow the central chassis 16 of the combine 12. This, in turn, enables a significantly shorter unloading device such as auger 70 to be utilized to deliver grain from the grain tank 18 to the receptacle 24 of the grain cart 22. As shown in dashed lines in FIG. 1, an alternative to the steering and propulsion inputs provided by device 68 on tractor 38 is a device 88 mounted on, and receiving prime power from the combine 10 and extending to the grain cart 22 through connector 90. In this case, the control of grain cart 22 is provided from the combine 10, either by direct operator inputs or with an appropriate interactive control maintaining the grain cart 22 at a given position relative to the central chassis 16. For example the grain cart can be controlled to nutate around the discharge end of the auger 70 so that harvested crop material is uniformly distributed in the grain receptacle 24.

Figure 4:
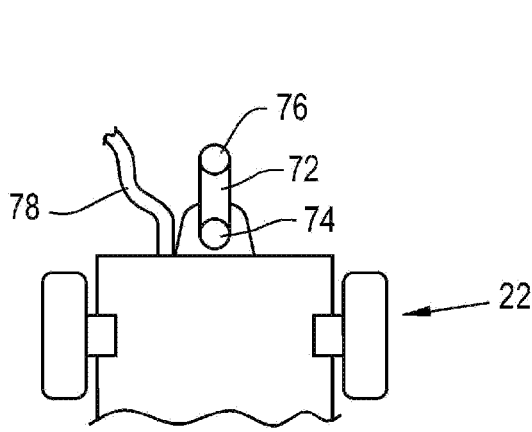
FIG. 4 shows one form of a connector for steering and propulsion inputs for the grain cart of FIG. 1.

Referring to FIG. 4, there is shown one form of interconnection between the grain cart 22 and the tractor 38. A tongue 72 is pivotally connected to the front of grain cart 22 at 74 and has an appropriate connection 76 for connecting to the hitch of tractor 38 for towing in the usual fashion. In addition, FIG. 4 shows a flexible cable 78 providing an interconnection of either electrical or hydraulic conduits to the appropriate motors on grain cart 22 for steering and/or control of the forward rate of speed of the grain cart 22. In the arrangement shown in FIG. 4, the tongue 72 is disconnected from tractor 38 when grain is to be unloaded and the cable 78 played out so that the grain cart may be deployed to an operational position close to the central chassis 16 of the combine and lateral to the ground movement of tractor 38. It is also possible that the cable 78 may be configured so that it has a variable extension from tractor 38. As such, the operator of tractor 38 can control the velocity and direction of grain cart 22 to place it in dynamic position adjacent the central chassis of the combine and enable an unloading mechanism 28 from combine 10 that is of minimal length. When the grain cart 22 is fully loaded, it is steered into fore and aft alignment with tractor 38 and the tongue 72 connected so as to provide standard towing of the grain cart to the next step in the process of distributing the crop material thus harvested.

Figure 5:
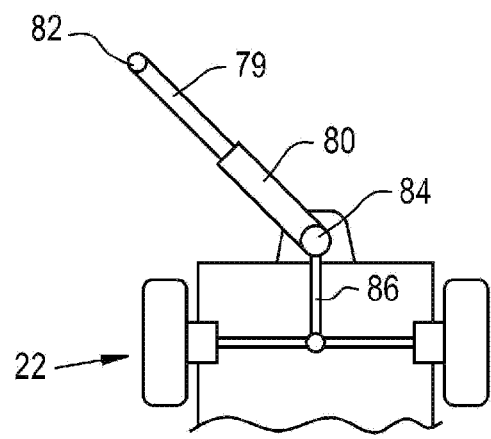
FIG. 5 shows another form of steering and connector for steering and control inputs of the grain cart of FIG. 1.

FIG. 5 shows an alternative arrangement in which a substantially rigid but pivotable tongue is used for a multitude of functions. In this figure, a tongue having first and second telescoping hollow assemblies 79 and 80 respectively connected to pivot points 82 on tractor 38 and 84 on grain cart 22. The telescoping assemblies are hollow so that the control conduits 86, which ultimately connect to the appropriate wheels, can be extended through to provide a steering and propulsion control input from tractor 38 to the grain cart 22. Because the tongues 79 and 80 are telescoped and hollow, they provide mechanical protection for the lines running therethrough, whether they be electrical or hydraulic. In this case, the pivoting connections 82 and 84 remain connected to the tractor 38 and grain cart 22 respectively during the unloading operation. When an unloading operation is completed, the grain cart 22 is steered into a position directly behind the tractor to provide for towing of the grain cart 22 to the next step in the collection of crop material. The advantage of the arrangement in FIG. 5 is that there is always a positive mechanical connection between the tractor 38 and the grain cart 22 while still permitting lateral control of the velocity and steering for the grain cart 22.

It should be apparent to those skilled in the art that the connector arrangements for both electrical and hydraulic inputs may be utilized for control from the combine 10. For example The arrangement described above provides a significant advantage when deployed with a harvesting mechanism of the size currently experienced in the art. By enabling a relatively short unloading auger for the grain tank and the combine, the mechanism is simplified and inherently made more efficient. The use of hydraulic or electric for the grain cart wheels provides a significant degree of flexibility while, at the same time, providing significant control inputs from a position lateral to the movement of the grain cart alongside the central chassis 16 of the combine 10.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A self-propelled grain cart for use with an agricultural combine having a central chassis and laterally elongated harvesting mechanism, said cart comprising:
   a grain receptacle;
   a plurality of wheels connected to said grain cart at, at least one of said wheels being steerable and at least one of said wheels being powered for ground movement of said grain cart in a given direction;
   an elongated connector operatively connected at one end thereof to said at least one steerable wheel and at least one powered wheel, said connector having an opposite end deployable laterally beyond the width of said grain cart relative to the said given direction of ground movement of said grain cart; and
   a device connected to said opposite end of said elongated connector for supplying ground movement and steering inputs to said at least one wheel, whereby said grain cart can be deployed close to the central chassis of said combine.

2. The self-propelled grain cart as claimed in claim 1, wherein said elongated connector is flexible.

3. The self-propelled grain cart of claim 1, wherein the connector includes a telescoping tongue pivotable on said grain cart.

4. The self-propelled grain cart as claimed in claim 3, wherein said tongue is hollow.

5. The self-propelled grain cart as claimed in claim 1, further comprising electric motors connected to at least one of said wheels, wherein said connector supplies electrical inputs to said motors.

6. The self-propelled grain cart as claimed in claim 3, further comprising hydraulic motors connected to said at least one of said wheels and hydraulic lines supplying hydraulic fluid to operate said motor.

7. The self-propelled grain cart as claimed in claim 6, wherein said tongue is hollow and said hydraulic lines extend through said hollow tongue for protection.

8. The self-propelled grain cart as claimed in claim 1, wherein said front wheels of said cart are steerable.

9. The flexible grain cart as claimed in claim 8, wherein said rear wheels are powered.

10. The flexible grain cart as claimed in claim 1, wherein said front wheels are differentially powered to provide a steering and propulsion input thereto.

11. An agricultural crop unloading system for use with an agricultural combine having a central chassis and laterally elongated harvesting mechanism, said crop unloading system comprising:
    a self-propelled agricultural vehicle having a prime mover and capable of operator-controlled ground movement and supplying extra power,
    a grain cart having a grain receptacle,
    a plurality of wheels connected to said grain receptacle, at least one of said wheels being steerable and at least one of said wheels being powered for ground movement of said grain cart in a given direction;
    an elongated connector operatively connected to said at least one steerable wheel and at least one powered wheel, said connector having an opposite end deployable laterally beyond the width of said grain cart relative to the said given direction of ground movement for said grain cart; and
    a device mounted on one of said self-propelled agricultural vehicle and said combine and connected to said opposite end of the elongated connector for supplying ground movement and steering inputs to at least one wheel whereby said grain cart can be deployed close to the central chassis of said combine.

12. The agricultural crop unloading system of claim 11, wherein said connector is flexible.

13. The crop unloading system of claim 11, wherein said connector includes a rigid tongue telescoping between said grain receptacle and said agricultural vehicle, said tongue being pivotable.

14. The agricultural crop unloading system of claim 13, wherein said tongue is hollow and provides protection.

15. The agricultural crop harvesting system of claim 11, further comprising electrical motors connected to said at least one of said wheels on said grain receptacle and wherein said agricultural vehicle provides an electrical source for said wheels.

16. The agricultural crop harvesting system of claim 13, further comprising a hydraulic motor connected to said at least one of said wheels on said grain receptacle and hydraulic lines supplying hydraulic fluid to said motor and said agricultural vehicle provides the source of said hydraulic fluid to said hydraulic lines.

17. The agricultural crop harvesting system of claim 16, wherein said tongue is connectable between said grain cart and said agricultural vehicle is hollow and said hydraulic lines extend therethrough for protection.

18. The crop harvesting system of claim 11, wherein said front wheels of said grain cart are steerable.

19. The agricultural crop harvesting system of claim 18, wherein said rear wheels are powered.

20. The agricultural crop harvesting system of claim 11, wherein said front wheels are differentially powered, thereby providing both steering and propulsion input.

\* \* \* \* \*